United States Patent Office 3,770,715
Patented Nov. 6, 1973

3,770,715
ACTH-ACTIVE PEPTIDES HAVING D-SERINE AS FIRST AMINOACID FROM N-TERMINUS AND L-ORNITHINE AS 11-AMINOACID
Godefridus Ignatius Tesser, Nijmwegen, Netherlands, and Werner Rittel, Basel, Switzerland, assignors to Ciba-Geigy Corporation
Filed June 2, 1970, Ser. No. 42,886
Claims priority, application Switzerland, June 10, 1969, 8,801/69
Int. Cl. C07c 103/52; C07g 7/00; C08h 1/00
U.S. Cl. 260—112.5                                    7 Claims

ABSTRACT OF THE DISCLOSURE

Adrenocorticotropically active peptides which differ from (all-L)-ACTH-active peptides having a sequence of 18–39 aminoacids in that they contain as the first aminoacid (from the N-terminus) D-serine and as aminoacid in the positions 11 or 11 and 15–16 or 11 and 15–18, L-ornithine, and their C-terminal amides and acid addition salts and complexes of these compounds.

It is known that individual aminoacids of the natural ACTH-sequences, especially those in positions 1–5, 17, 18, 19 and 25, can be exchanged for various other α-aminoacids without appreciably reducing the ACTH-activity of the peptide. Thus, for example, the first aminoacid (from the N-terminus) can be replaced by glycine or by an aminoacid having the D-configuration, such as D-threonine, D-alanine, D-proline, or above all D-serine, the second aminoacid can be replaced by phenylalanine, the third by glycine or alanine, the fourth by α-lower alkyl-α-aminoacetyl such as norvaline, norleucine, leucine, valine, isoleucine or α-aminobutyric acid, the fifth by glutamine, the 17th and 18th by ornithine or lysine, the 19th or 25th by valine. The peptide may contain one or several "exchange aminoacids".

Surprisingly, it has now been found that peptides with much improved and/or prolonged action as compared to natural corticotropine are obtained when the aminoacid in 11-position and, if desired, also the aminoacids in 15- and 16-position or in 15- to 18-position, are replaced by L-ornithine.

The present invention is therefore concerned with peptides which differ from (all L-)-ACTH-active peptides having 18–39 aminoacids in that they contain as the first aminoacid D-serine and contain ornithine in positions 11 or 11 and 15–16 or 11 and 15–18, and which may contain further exchangeable aminoacids in positions 2–5, 19 and/or 25, as well as N-unsubstituted C-terminal amides of these peptides and acid addition salts and complexes of these compounds.

These peptides and peptide amides preferably contain 18–25 aminoacids. Special mention is deserved by D–Ser$^1$-octadecapeptideamides having L-ornithine in the positions mentioned. The new peptides having L-ornithine in positions 11 or 11 and 15–16 may contain L-lysine in the 17- and 18-position. Special mention may be made of D-Ser$^1$-Orn$^{11}$-Lys$^{17,18}$-β$^{1-18}$-corticotropine-Lys$^{18}$-amide.

As acid addition salts there come into consideration especially salts of therapeutically acceptable acids, such as hydrochloric, acetic, sulfuric or phosphoric acid or long-chain fatty acids.

The term "complexes" describes the complex-like compounds, whose structure has not yet been clarified, which are formed when certain inorganic or organic substances are added to adrenocorticotropically active peptides, and especially those which prolong their activity. Such inorganic substances are compounds derived from metals such as calcium, magnesium, aluminum, cobalt or especially zinc, in the first place sparingly soluble salts such as phosphates, pyrophosphates, polyphosphates and hydroxides of these metals; also alkali metal polyphosphates. Organic substances that prolong the activity are, for example, non-antigenic gelatin, for example oxypolygelatin, polyvinylpyrrolidone and carboxymethyl cellulose; furthermore sulfonic or phosphoric acid esters of alginic acid, dextran, polyphenols and polyalcohols, especially polyphloretine phosphate and phytic acid as well as polymers and copolymers of aminoacids, for example protamine and especially of aminoacids containing a preponderant share of acid α-aminoacids, such as glutamic or aspartic acid.

According to the process of this invention for the manufacture of the new peptides, and of their amides, acid addition salts and complexes of these compounds, the protective groups are eliminated from ACTH-active peptides comprising a sequence of 18 to 39 aminoacids and D-serine as the first aminoacid and containing ornithine radicals in positions 11 or 11 and 15–16 or 11 and 15 to 18, in which peptides at least the α-amino group and the amino groups of the side chains as well as the carboxyl groups of the side chains and the terminal carboxyl group are protected, or from their C-terminal amides and, if desired, the resulting compounds are converted into their acid addition salts or complexes.

The starting materials are manufactured by the methods known for the production of long-chain peptides, especially of the ACTH-active peptides.

The protective groups in the starting materials and in the intermediates required for the synthesis of the starting materials are the groups conventionally used in the peptide synthesis, especially those known for the synthesis of the ACTH-sequence, furthermore, if desired, recently proposed groups, for example the groups described in French specification 1,554,051. As amino protective groups there may be mentioned, for example, unsubstituted or substituted aralkyl groups such as diphenylmethyl or triphenylmethyl groups, or acyl groups such as formyl, trifluoroacetyl, phthaloyl, para-toluenesulfonyl, benzylsulfonyl, benzenesulphenyl, ortho-nitrophenylsulphenyl, or especially groups derived from carbonic or thiocarbonic acid, such as carbobenzoxy groups whose aromatic radical may be substituted by halogen atoms or by nitro, lower alkyl, lower alkoxy or lower carbalkoxy groups, for example carbobenzoxy, para-bromo- or para-chloro-carbobenzoxy, para-nitrocarbobenzoxy, para-methoxycarbobenzoxy, colored benzyloxycarbonyl groups such as para-phenylazo-benzyloxycarbonyl and para-(para′-methoxyphenylazo)-benzyloxycarbonyl, tolyloxycarbonyl, 2-phenyl-isopropoxycarbonyl, 2-tolyl-isopropoxycarbonyl and in the first place 2-para-diphenyl-isopropoxycarbonyl (see French specification No. 1,554,051), also aliphatic oxycarbonyl groups, for example allyloxycarbonyl, cyclopentyloxycarbonyl, tertiary amyloxycarbonyl, adamantyloxycarbonyl and in the first place tertiary butoxycarbonyl; furthermore, for example, carbamoyl, thiocarbamoyl, N-phenylcarbamoyl and -thiocarbamoyl.

The carboxyl groups are protected, for example, by amide or hydrazide formation or by esterification. For the esterification there may be used, for example, lower unsubstituted or substituted alkanols such as methanol, ethanol, cyanomethyl alcohol or especially tertiary butanol; also aralkanols such as aryl-lower alkanols, for example unsubstituted or substituted benzyl alcohols such as para-nitrobenzyl alcohol or para-methoxybenzyl alcohol, phenols and thiophenols such as para-nitrothiophenol, 2,4,5-trichlorophenol, para-cyanophenol or para-methanesulfonylphenol; furthermore, for example, N-hydroxysuccinimide and N-hydroxyphthalimide.

The hydroxyl groups of the side chains, for example of the serine and/or tyrosine radicals, can be protected by etherification, for example with benzyl alcohol or preferably with tertiary butanol, but it is not absolutely necessary to protect them. For protecting the amino group in the guanidino grouping of arginine the nitro group and the tosyl group are specially preferred, though it is not necessary to protect the guanidino group. Nor is it absolutely necessary for the imino group of histidine to be protected, though it may be advantageous to protect it, for example by benzyl, trityl, adamantyloxycarbonyl or by the 2,2,2-trifluoro-1-tertiary butoxycarbonyl-aminoethyl or 1-benzyloxycarbonyl-aminoethyl groups. The protective groups are eliminated in the known manner by hydrogenolysis or hydrolysis, especially by acid hydrolysis, in a single step or, if desired, in several steps.

A preferred starting peptide is one in which the amino groups of the side chains are protected by the tertiary butoxycarbonyl group and the carboxyl groups of the side chains and of the C-terminal acid—provided they are not amidated—are protected by the tertiary butylester group. These protective groups are advantageously eliminated by means of trifluoro-acetic acid.

To manufacture the starting peptides the aminoacids are linked together in the desired sequence either singly or as preformed small peptide units. The linking of the amino-acid and/or peptide units is carried out as follows: An amino-acid or a peptide containing a protected $\alpha$-amino group and an activated terminal carboxyl group is reacted with an aminoacid or a peptide containing a free $\alpha$-amino group and a free or protected (for example esterified or amidated( terminal carboxyl group; or an aminoacid or a peptide containing an activated $\alpha$-amino group and a protected terminal carboxyl group is reacted with an aminoacid or a peptide containing a free terminal carboxyl group and a protected $\alpha$-amino group. The carboxyl group can be activated, for example, by conversion into an acid azide, anhydride, imidazolide or isoxazolide, or into an activated ester such as cyanomethyl ester, carboxymethyl ester, para-nitrophenyl ester, 2,4,5-trichlorophenyl ester, pentachlorophenyl ester, N-hydroxysuccinimide ester, N-hydroxyphthalimide ester, 8-hydroxyquinoline ester, N-hydroxypiperidine ester, or by reaction with a carbodiimide (if desired with addition of N-hydroxysuccinimide) or N,N'-carbonyldiimidazole. The amino group can be activated, for example, with a phosphite amide. The most frequently used methods are the carbodiimide method, the azide method, the method of the activated esters, the anhydride method and the Merrifield method.

Any free functional groups not participating in the reaction are advantageously protected, especially with radicals easily eliminable by hydrolysis or reduction as mentioned above.

Depending on the reaction conditions employed the new compounds are obtained in the form of bases or of their salts. From the salts the bases can be prepared in the known manner. When the bases are reacted with acids capable of forming therapeutically acceptable salts, they furnish salts, for example salts with inorganic acids, such as hydrohalic acids, for example hydrochloric or hydrobromic acid, perchloric, nitric, thiocyanic, sulfuric or phosphoric acid, or with organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, pamoic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulphanilic acid.

The peptides obtained by the present process can be used in the form of pharmaceutical preparations which contain the peptides in conjunction or admixture with an organic or inorganic pharmaceutical excipient suitable, for example, for intravenous, intramuscular, subcutaneous or intranasal administration. Suitable excipients are substances that do not react with the polypeptides, for example gelatin, lactose, glucose, starches, cellulose (for example "Avicel," microcrystalline cellulose) and cellulose derivatives such as carboxymethylcellulose, methylcellulose or ethylcellulose, talcum, magnesium stearate, gums, polyalkyleneglycols, water, mono- or polyhydric alcohols such as ethanol, isopropanol, glycerin, hexites, vegetable oils and other fatty acid esters such as arachis oil, cotton seed oil, almond oil, olive oil, castor oil, ethyloleate, isopropylmyristate, isopropylpalmitate, "Cetiol V" (oleic acid ester of liquid aliphatic alcohols), "Miglyol" or "Labrafac" (triglyceride mixtures of fatty acids containing 8 to 12 carbon atoms), "Labrafil M 2735" or "Labrafac WL 1219" (mixtures of glycerin and polyoxyethylene fatty acid esters), "Arlacel" (sorbitan fatty acid ester), "Tween" (polyoxyethylene-sorbitan monooleate) or other known medicinal excipients. The pharmaceutical preparations may be, for example, tablets, dragees or capsules, or in liquid form solutions, suspensions or emulsions. They may be sterilized and/or contain adjuvants such as preserving, stabilizing, wetting or emulsifying agents. They may also contain further therapeutically valuable substances.

For therapeutic purposes there are used 0.01 to 3 mg. of the peptide in solution or suspension, preferably in the form of a complex having a prolonged activity, for example as the zinc complex suspension or gelatin solution or a polyphloretine phosphate solution. The solutions or suspensions are given in a dose of 0.1 to 5 ml., for example intravenously, intramuscularly, subcutaneously or intranasally. The drug may be given, for example, once to three times daily or once or several times per week. The free peptide is preferably given intravenously or intramuscularly, whereas the complexes, for example the zinc complexes, are preferably administered intramuscularly or subcutaneously.

The following examples illustrate the invention. The following abbreviations have been used:

BOC=tertiary butoxycarbonyl
Z=carbobenzoxy
tBu=tertiary butyl
Me=methyl.

In thin-layer chromatography the following systems are used:

System 52A=n-butanol glacial acetic acid-water (67:10:23)
System 101=n-butanol-pyridine-glacial acetic acid water (38:24:8:30)
System 101B=n-butanol-pyridine-glycial acetic acid water (40:24:6:30)
System 1=benzene+acetone (1:1)
System 2=chloroform+methanol (4:1).

EXAMPLE 1

H-D-Ser-Tyr-Ser-Met-Glu-His-Phe - Arg - Try-Gly-Orn-Pro - Val - Gly - Orn - Orn Orn - Orn - $NH_2$ (D - Ser$^1$-Orn$^{11,15-18}$-$\beta^{1-18}$-corticotropin-Orn$^{18}$-amide)

100 mg. of BOC-D-Ser-Tyr-Ser-Met-Glu(OtBu)-His-Phe-Arg-Try-Gly-Orn(BOC) - Pro - Val-Gly-Orn(BOC)-Orn(BOC)-Orn(BOC)-Orn(BOC)-$NH_2$-acetate are dissolved in 2 ml. of a mixture of trifluoroacetic acid+water (10:1). After 90 minutes at room temperature part of the acid is steamed out of the batch, and the residue is taken up in water and once more evaporated. This operation is repeated twice more and the residue is lyophilized. The product is then dissolved in 10 ml. of water and the solution percolated through a weakly basic ion exchange resin (Merck II, acetate form). The column is washed with double distilled water and the filtrate is collected as long as the Folin-Ciocalteux reaction remains positive. Lyophilization of the filtrate and drying over phosphorus pentoxide furnishes 80 mg. of D-Ser$^1$-Orn$^{11\text{-}15\text{-}18}$-β$^{1\text{-}18}$-corticotropin-Orn$^{18}$-amide.

The following Rƒ values are found in the thin-layer chromatogram on alumina: Rƒ$_{52A}$=0.10; Rƒ$_{101B}$=0.21 and Rƒ$_{101}$=0.19. In the thin-layer electrophoresis on cellulose plates (280 volt, pH 1.9 [acetic acid+formic acid buffer]) the compound travels in 30 minutes 3 cm. towards the cathode.

The starting product can be prepared thus:

(1)          Z-Orn(BOC)-OMe 9.15 grams of Z-Orn(BOC)-OH are added to an ethereal solution of diazomethane. When the evolution of nitrogen has ceased, the solution is kept for 2 hours at room temperature and the excess diazomethane is decomposed by dropping in glacial acetic acid. The solution is then evaporated to dryness. The resulting methyl ester is crystallized from ether+petroleum ether (1:1) or from diisopropyl ether; it melts at 71° C. [α]$_D^{27}$=—14.4° (c.=1.08 in 90% acetic acid).

The thin-layer chromatogram on silica gel reveals an Rƒ$_1$ of 0.69 and an Rƒ$_2$ of 0.83.

(2)          H-Orn(BOC)-OMe 5.0 grams of Z-Orn(BOC)-OMe (13.2 mmols) are hydrogenated in 50 ml. of methanol containing 1 ml. of glacial acetic acid in the presence of palladium carbon (10% Pd). After having evaporated the solvent, a thickish oil is obtained which is dried for a short time at a bath temperature of 40° C. under $10^{-2}$ mm. Hg pressure. The product is further processed as it is obtained.

(3)          Z-Orn(BOC)-Orn(BOC)-OMe

The residue obtained in (2) is dissolved in 10 ml. of dimethylformamide, and 6.57 g. (13.9 mmols) of Z-Orn(BOC)-paranitrophenyl ester are added. The batch is allowed to react for 16 hours at room temperature and then diluted with 250 ml. of water. The dipeptide ester settles out in crystalline form; it is recrystallized from 30 ml. of boiling methanol and 25 ml. of water heated at 60° C. On slow cooling to 0° C. the pure product is obtained which melts at 125° C. [α]$_D^{20}$=—15.1°±1° (c.=1.34 in 90% acetic acid). In the thin-layer chromatogram on silica gel Rƒ$_1$=0.71, Rƒ$_2$=0.85.

(4)          Z-Orn(BOC)-Orn(BOC)-OH 8.1 grams (13.65 mmols) of Z-Orn(BOC)-Orn(BOC)-OMe are dissolved in 68.2 ml. of dioxan and 68.2 ml. of 0.2 N-sodium hydroxide solution are stirred in dropwise. The mixture is then concentrated to about a quarter of its volume. The clear yellow solution is mixed with 15.1 g. of citric acid, and then ethyl acetate is added to dissolve the white precipitate. The bottom layer is then replaced by fresh 1% citric acid. The organic phase is extracted with this solution and then with water until the washings run neutral, dried and evaporated. The residue is dried under a high vacuum. In the thin-layer chromatogram on silica gel Rƒ$_1$=0.03 and Rƒ$_2$=0.22. [α]$_D^{20}$=—3.1°±1° (c.=1 in methanol).

(5)          H-Orn(BOC)-Orn(BOC)-OMe 6.4 grams (10.8 mmols) of Z-Orn(BOC)-Orn(BOC)-OMe are hydrogenated in 64 ml. of methanol in the presence of 600 mg. of palladium carbon (10% Pd). The absorption of hydrogen ceases after 5 minutes, the solution is filtered and immediately used in the reaction (6).

(6)   Z-Orn(BOC)-Orn(BOC)-Orn(BC)-Orn(BOC)-OMe 6.3 grams (10.8 mmols) of Z-Orn(BOC)-Orn(BOC)-OH are added to the filtrate obtained in (5). The batch is then evaporated to dryness and the residue dissolved in 25 ml. of dimethylformamide. The residual methanol is expelled under vacuum, 2.48 g. of N-hydroxysuccinimide are added, the mixture is cooled to —20° C. and, while maintaining this temperature, 2.45 g. (21.6 mmols) of dicyclohexylcarbodiimide are added. The batch is then kept for 6 hours at —20° C. and then for 18 hours at 0° C. Then the dicyclohexylurea is filtered off, the solvent evaporated under 0.01 mm. Hg, the residue is dissolved in ethyl acetate, filtered and the filtrate is extracted with 3× 50 ml. of water, 3× 50 ml. of saturated sodium hydrogencarbonate solution, 3× 60 ml. of 1% citric acid and finally with water until the washings run neutral. The organic phase is dried and evaporated under vacuum. The residue is recrystallized from aqueous methanol. The product melts at 152° C. In the thin-layer chromatogram on silica gel Rƒ$_1$=0.36 and Rƒ$_2$=0.91.

$$[α]_D^{20}=-17.8±1°$$

(c.=1 in methanol).

(7)   H-Orn(BOC)-Orn(BOC)-Orn(BOC)-Orn(BOC)-OMe 4.1 grams of the ester obtained under (6) are hydrogenated in 50 ml. of methanol in the presence of 400 mg. of palladium carbon (10% Pd). After 30 minutes the reaction is complete. Rƒ$_1$=0.13, Rƒ$_2$=0.60. The methanol solution is further worked up as it is obtained (cf. under [10] below).

(8)          Z-Orn(BOC)-Pro-Val-Gly-OC$_2$H$_5$ 6.5 grams (15 mmols) of Z-Pro-Val-Gly-OC$_2$H$_5$ are hydrogenated in a mixture of 130 ml. of methanol and 4.5 ml. of glacial acetic acid. The resulting tripeptide ester acetate is dissolved in 40 ml. of dimethylformamide and mixed with a solution of 8.78 g. (18 mmols) of Z-Orn(BOC)-para-nitrophenyl ester in 25 ml. of dimethylformamide. The mixture is kept for 16 hours at room temperature. Then the undissolved material is filtered off, the filtrate diluted with four times its own volume of water and the turbid mixture is extracted with ethyl acetate. The extract is washed with 5% sodium carbonate solution until the aqueous phase is free from para-nitrophenol, then washed with citric acid solution, water and finally with sodium chloride solution, dried over magnesium sulfate, concentrated to about 40 ml. and diluted with diisopropyl ether to 250 ml. The precipitate is filtered off, washed with diisopropyl ether and crystallized from ethanol+diisopropylether; the product melts at 125° C. [α]$_D^{23}$=—79.4°±1° (c.=1 in methanol). In the thin-layer chromatogram on silica gel Rƒ$_1$=0.41 and Rƒ$_2$=0.84.

(9)          Z-Orn(BOC)-Pro-Val-Gly-OH 3.14 g. (5 mmols) of the above protected tetrapeptide ester are dissolved in 80 ml. of dioxan and 80 ml. of 0.0625 N-sodium hydroxide solution (5 mmols) are added. The clear, yellow solution is concentrated until turbidity sets in, then about 10 mmols of citric acid are added and the emulsion is extracted with 2× 100 ml. of ethyl acetate. The extracts are combined and washed with citric acid solution and then with water, dried and evaporated and furnish on addition of diisopropyl ether a powder that is easy to filter. The substance melts unsharply at 95° C. [α]$_D^{22}$=—66.5°±1° (c.=1 in methanol). In the thin-layer chromatogram on silica gel Rƒ$_1$=0.0 and Rƒ$_2$=0.13.

(10)   Z-Orn(BOC)-Pro-Val-Gly-Orn(BOC)-Orn(BOC)-Orn(BOC)-Orn(BOC)-OMe

The methanolic solution of H-Orn(BOC)-Orn(BOC)-Orn(BOC)-Orn(BOC)-OMe obtained under (7) is evaporated to dryness, the residue is taken up in 10 ml. of dimethylformamide, the solution mixed with 0.92 g. (8 mmols) N - hydroxysuccinimide and 2.54 g. of Z-Orn(BOC)-Pro-Val-Gly-OH and the mixture is stirred until all has dissolved, then cooled to —20° C. and 1.0 g. of dicyclohexylcarbodiimide is added. The mixture is kept for a few hours at —20° C. and then for a few days at 0° C. The precipitate is then filtered off and the filtrate evaporated under a high vacuum. The thickish oil is mixed with ten times its own volume of ether, whereby the octapeptide derivative is obtained as a powder, which melts at 145–155° C. $[\alpha]_D^{22}=-41.0°\pm1°$ c.=1 in methanol). In the thin-layer chromatogram on silica gel $Rf_1=0.10$ and $Rf_2=0.88$.

(11) Z-Orn(BOC)-Pro-Val-Gly-Orn(BOC)-
Orn(BOC)-Orn(BOC)-Orn(BOC)-NH$_2$ 1.5 grams of the protected octapeptide ester are suspended in anhydrous methanol and dissolved in methanol by adding a saturated solution of anhydrous ammonia. The solution is kept for 3 days at room temperature, then evaporated to dryness and the residue is taken up in ether or diisopropyl ether. The precipitate is filtered off and subjected to a counter-current distribution in the system petroleum ether+ethyl acetate+methanol+water (8:16:9:6). After 150 steps the protected octapeptide-amide is isolated from the elements 38–56 ($r_{max}=42$, K=0.39). It melts at 198° C. $[\alpha]_D^{22}=-33.0°\pm1°$ (c.=1 in methanol). In the thin-layer chromatogram on silica gel $Rf_1=0.0$ and $Rf_2=0.90$.

(12) H-Orn(BOC)-Pro-Val-Gly-Orn(BOC)-
Orn(BOC)-Orn(BOC)-Orn(BOC)-NH$_2$, HCl 443 mg. (0.3 mmol) of the protected octapeptide-amide are dissolved in 45 ml. of methanol, 5 ml. of hydrochloric acid (0.3 mmol) are added and the whole is hydrogenated for 3 hours in the presence of 100 mg. of palladium carbon. In the thin-layer chromatogram on silica gel the above octapeptide-amide hydrochloride reveals an $Rf_2$ of 0.76. The methanolic solution is further worked as it is obtained.

(13) BOC-D-Ser-Tyr-Ser-Met - Glu(OtBu) - His - Phe-Arg-Try-Gly-Orn(BOC)-Pro - Val - Gly - Orn(BOC)-Orn(BOC)-Orn(BOC)-Orn(BOC)-NH$_2$, acetate The methanolic solution obtained under (12) is neutralized by adding 0.025 ml. (0.3 mmol) of pyridine to it, then the solvent is removed and the residue taken up in 10 ml. of dimethylformamide. This solution is mixed with 524 mg. (0.36 mmol) of BOC-D-Ser-Tyr-Ser-Met-Glu-(OtBu)-His-Phe-Arg-Try-Gly-OH (cf. French specification 1,512,342) and 41.4 mg. of N-hydroxy-succinimide. The mixture is stirred for 2 hours, then 75 mg. of dicyclohexylcarbodiimide are added and the whole is stirred on for 3 days, then filtered, the filtrate is evaporated to dryness under a high vacuum, the residue is triturated with ether and the crude octadecapeptide-amide is purified by a counter-current distribution in the system methanol+buffer+chloroform+carbon tetrachloride (8:3:6:2) [buffer=28.5 g. of glacial acetic acid+19.25 g. of ammonium acetate+water made up to 1 liter). After 275 steps the product is isolated ($r_{max}=45$, K=0.20). $[\alpha]_D^{21}=-25.3°\pm1°$ (c.=0.5 in glacial acetic acid). In the thin-layer chromatogram on silica gel in chloroform+methanol (3:1) Rf=0.62.

EXAMPLE 2

93 mg. of BOC-D-Ser-Tyr-Ser-Met - Glu(OtBu) - His-Phe-Arg-Trp-Gly-Orn(BOC)-Pro-Val - Gly - Lys(BOC)-Lys(BOC)-Lys(BOC) - Lys(BOC) - NH$_2$—toluene sulfonate are dissolved under nitrogen in 1.4 ml. of 90% ice-cold trifluoracetic acid, and the solution is allowed to stand at 0° for 30 minutes. Precipitation is induced wtih peroxide-free ether, the batch allowed to stand at 0° C. for 3 hours, the resulting fine powder is filtered off with suction, washed three times with ether, and dried in an evacuated desiccator over caustic soda. The mixture is then again dissolved under nitrogen in 1.5 ml. of 90% trifluoracetic acid, and allowed to stand at 22° C. for 1 hour. Precipitation with ether is then carried out as above. The dry powder is dissolved in 5% acetic acid and the solution filtered, for removal of toluene sulfonate ions and trifluoracetate ions, through a column of Merck ion exchanger No. II (weakly basic, acetate form). The column is rinsed with 5% acetic acid, and the eluate is lyophilized. There are obtained 71 mg. of D-Ser-Tyr-Ser-Met-Glu-His-Phe-Arg-Trp-Gly-Orn-Pro-Val - Gly - Lys-Lys-Lys-Lys-NH$_2$-hexaacetate.

In the thin-layer chromatogram on a cellulose plate the product shows an $Rf_{101A}$ value of 0.37 and an $Rf_{101B}$ value of 0.22.

The starting material can be prepared as follows:

(1)  H-Lys(BOC)-Lys(BOC)-Lys(BOC)-Lys(BOC)-NH$_2$

A solution of 3.8 g. of Z-Lys(BOC)-Lys(BOC)-NH-NH$_2$ in 40 ml. of dimethylformamide is cooled to −30° C. There are then added 6.1 ml. of 1 N-aqueous sodium nitrite solution. The batch is stirred at −10° C. for 15 minutes, and 3.1 g. of H-Yys(BOC)-Lys(BOC)-NH$_2$, dissolved in 15 ml. of dimethylformamide are added. At −10° C., 2.24 g. of diisopropylethylamine are then added dropwise, and the mixture is allowed to stand at 0° C. for 18 hours. There follows evaporation at 40° C. under a pressure of 0.01 mm. of Hg to a volume of about 10–15 ml., precipitation, by the addition of much ice-water, of the tetrapeptide derivative, which is then well triturated, filtered with suction and rinsed with ice-water. The powder is dried and the crude product is purified by chromatography on silica gel (column prepared in chloroform), the tetrapeptide derivative being eluted by the addition of methanol (30%). The various fractions, which according to the thin-layer chromatogram on silica gel (system chloroform/methanol 4:1) constitute the pure product, are combined and evaporated to dryness. The tetrapeptide derivative is then dissolved in methanol and the carbobenzoxy group is eliminated by hydrogenation in the presence of palladium carbon.

(2)  Z-Orn(BOC)-Pro-Val-Gly-OH

A solution of 8 g. of H-Pro-Val-Gly-OC$_2$H$_5$ and 14.7 g. of Z-Orn(BOC)-para-nitrophenyl ester in 80 ml. of dimethylformamide is allowed to stand at 28° C. for 18 hours, filtered, diluted with 4 times its volume of water, and extracted with ethyl acetate. To eliminate the para-nitrophenol, the ethyl acetate solution is washed with sodium carbonate solution, while cooling with ice, until the sodium carbonate solution is but faintly yellow-colored. The batch is then washed with water, dried with sodium sulfate, filtered, the filtrate evaporated to a volume of about 120 ml., and 750 ml. of diisopropyl ether are added, whereupon the tetrapeptide derivative crystallizes. 13 g. of Z-Orn(BOC)-Pro-Val-Gly-OC$_2$H$_5$ of melting point 125° C. are obtained; $[\alpha]_D^{23}=-79.4°$ (c.=1 in methanol). 10 g. of this product are dissolved in 250 ml. of dioxan, and 250 ml. of 0.06 N-aqueous sodium hydroxide solution are added. The batch is allowed to stand at room temperature for 3 hours, then evaporated at a bath temperature of 35° C. under a pressure of 11 mm. of Hg to one-third its volume, acidified by the addition of 20% citric acid solution, and the precipitated oil is dissolved in ethyl acetate. The ethyl acetate solution is washed with citric acid solution, and with water, dried and evaporated. The residue is triturated with diisopropyl ether, and Z-Orn(BOC)-Pro-Val-Gly-OH obtained as a powder of melting point 95° C.; $[\alpha]_D^{20}=-66.5°$ (c.=1 in methanol).

(3)  H-Orn(BOC)-Pro-Val-Gly-Lys(BOC)-Lys(BOC)-Lys(BOC)-Lys(BOC)-NH$_2$ 10.5 g. of H-Lys(BOC)-Lys(BOC)-Lys(BOC)-Lys-(BOC)-NH$_2$ and 3.3 g. of dicyclohexylcarbodiimide are added to a solution of 7.7 g. of Z-Orn(BOC)-Pro-Val-Gly-OH and 2.8 g. of N-hydroxysuccinimide in 40 ml. of dimethylformamide and the reaction is allowed to proceed at 25° C. for 18 hours. The batch is then filtered and the filtrate evaporated in a high vacuum at 40° C. bath temperature until an oily consistency is achieved. This is followed by trituration with ether to obtain a powder, filtering with suction, washing with ether, drying and trituration with water. The batch is again filtered with suction, rinsed with water, and the crude product is dried in a desiccator over calcium chloride. For purification, the powder is reprecipitated twice from dimethylformamide-ether and twice from dimethylformamide-water. According to thin-layer chromatography on silica gel plates, the product is sufficiently pure for further processing; R$f$=0.9 in chloroform/methanol (4:1).

To eliminate the carbobenzoxy group, the product is dissolved in methanol and hydrogenated in the presence of palladium carbon (10% Pd).

(4) BOC - D - Ser-Tyr-Ser-Met-Glu(OtBu)His-Phe-Arg-Trp - Gly - Orn(BOC) - Pro - Val - Gly - Lys(BOC)-Lys(BOC)-Lys(BOC)-Lys(BOC)-$NH_2$ 1 g. of BOC-D-Ser-Tyr-Ser-Met-Glu(OtBu)-His-Phe-Arg-Trp-Gly-OH is suspended in 24 ml. of dimethylformamide. The suspension is stirred while 126 mg. of toluenesulfonic acid monohydrate and 110 mg. of N-hydroxysuccinimide are added. After stirring for 1 hour at room temperature, 910 mg. of H-Orn(BOC)-Pro-Val-Gly-Lys(BOC)-Lys(BOC)-Lys(BOC)-Lys(BOC) - $NH_2$ and 175 mg. of dicyclohexylcarbodiimide are added, the batch is heated to 45° C. while stirring, and stirring continued for 6 hours at that temperature. The batch is then cooled to room temperature, and the crude product precipitated by the addition of much peroxide-free ether, the dicyclohexylurea dissolving in ether. The batch is filtered with suction, the filter residue dried at 40° C. under reduced pressure, the powder washed with water, filtered again with suction, and dried as above. For purification, the crude product is subjected to a counter-current distribution in the system methanol-buffer:chloroform-carbon tetrachloride (8:3:6:2; buffer: 28.5 g. of acetic acid, 19.3 g. of ammonium acetate, 1 liter of water) over 225 stages. The maximum weight of the protected octadecapeptide amide is in fraction 47 (K=0.32). In the thin-layer chromatogram on silica gel plates in the system of chloroform-methanol (3:1) the peptide derivative shows and R$f$ value of 0.17. The pure fractions are combined, evaporated to dryness at a bath temperature of 40° C. under 11 mm. of Hg, and the residue is freed from ammonium acetate by drying at 45° C. under a pressure of 0.01 mm. of Hg.

EXAMPLE 3

A suspension is prepared from the following ingredients:

|  | Mg. |
|---|---|
| D - $Ser^1$-$Orn^{11,15-18}$-$\beta^{1-18}$-corticotropin-$Orn^{18}$-amide (hexaacetate) | 0.10 |
| $ZnCl_2$ | 5.25 |
| $Na_2HPO_4 \cdot 2H_2O$ | 1.05 |
| NaCl | 2.0 |
| Benzyl alcohol | 10.0 |
| 0.6 N-NaOH, ad pH=8.4 distilled water to make | 1.0 |

We claim:
1. A peptide of the formula

D - seryl - L - tyrosyl - C-L-E-L-F-L-histidyl-L-phenylalanyl - L - arginyl - L-tryptophyl-glycyl-L-ornithyl-L-prolyl-L-valyl-glycyl-L-A-L-A-L-B-L-B-X where A represents ornithyl or lysyl, B represents ornithyl, arginyl or lysyl, C represents L-seryl or glycyl, E represents methionyl or α-lower alkyl-α-aminoacetyl in which lower alkyl has 2–4 carbon atoms, F represents glutamyl or glutaminyl, X stands for OH, L-prolyl$^{19}$, L-prolyl$^{19}$-L-valyl$^{20}$, L-prolyl$^{19}$-L-valyl$^{20}$-L-lysyl$^{21}$, L-prolyl$^{19}$-L-valyl$^{20}$-L-lysyl$^{21}$-L-valyl$^{20}$, L-prolyl$^{19}$-L-valyl$^{20}$-L-lysyl$^{21}$-L-valyl$^{22}$-L-tyrosyl$^{23}$, L-prolyl$^{19}$-L-valyl$^{20}$-L-lysyl$^{21}$-L-valyl$^{22}$-L-tyrosyl$^{23}$-L-prolyl$^{24}$, L-prolyl$^{19}$-L-valyl$^{20}$-L-lysyl$^{21}$-L-valyl$^{22}$-L-tyrosyl$^{23}$-L-prolyl$^{24}$-L-aspartyl$^{25}$ and L-prolyl$^{19}$-L-valyl$^{20}$-L-lysyl$^{21}$-L-valyl$^{22}$-L-tyrosyl$^{23}$-L-prolyl$^{24}$-L-valyl$^{25}$ and corresponding peptides in which aminoacid 19 is L-valine or aminoacid 25 is L-valine, and their C-terminal unsubstituted amides and therapeutically acceptable acid addition salts and therapeutically acceptable complexes of these compounds.

2. Peptide amides as claimed in claim 1, where X stands for $NH_2$, aminoacids 15 and 16 represent ornithyl and aminoacids 17 and 18 represent ornithyl or arginyl, and wherein aminoacid 3 is L-seryl, aminoacid 4 is L-methionyl and aminoacid 5 is L-glutamyl.

3. A complex of a peptide as claimed in claim 1 with zinc phosphate, zinc pyrophosphate, zinc polyphosphate and/or zinc hydroxide.

4. A complex of a peptide as claimed in claim 1 with an alkali metal polyphosphate.

5. A complex of a peptide as claimed in claim 1 with hydroxypolygelatine, carboxymethyl cellulose, polyphloretine phosphate or polyglutamic acid.

6. D - $Ser^1$-$Orn^{11,15-18}$-$\beta^{1-18}$-corticotropine-$Orn^{18}$-amide, its therapeutically acceptable acid addition salts and complexes.

7. D - $Ser^1$ - $Orn^{11}$-$Lys^{17,18}$-$\beta^{1-18}$-corticotropine-$Lys^{18}$-amide, its therapeutically acceptable acid addition salts and complexes.

References Cited

UNITED STATES PATENTS

| | | | |
|---|---|---|---|
| 3,352,844 | 11/1967 | Boissonnas et al. | 260—112.5 |
| 3,503,951 | 3/1970 | Iselin et al. | 260—112.5 |
| 3,632,743 | 1/1972 | Geller et al. | 424—45 |
| 3,639,383 | 2/1972 | Geller | 260—112.5 |

FOREIGN PATENTS

| | | | |
|---|---|---|---|
| 6,801,798 | 8/1968 | Netherlands | 260—112.5 |
| 59,097 | 12/1967 | Germany | 260—112.5 |
| 1,132,264 | 10/1968 | Great Britain | 260—112.5 |
| 59,098 | 12/1967 | Germany | 260—112.5 |

LEWIS GOTTS, Primary Examiner

R. J. SUYAT, Assistant Examiner

U.S. Cl. X.R.

424—179